US012307516B1

United States Patent
Ciabattoni et al.

(10) Patent No.: US 12,307,516 B1
(45) Date of Patent: *May 20, 2025

(54) EXCHANGE ORDER PRIORITIZATION

(71) Applicant: Cboe Exchange, Inc., Chicago, IL (US)

(72) Inventors: William Ciabattoni, New York, NY (US); Adam Inzirillo, Bay Shore, NY (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,878

(22) Filed: Sep. 9, 2021

Related U.S. Application Data

(63) Continuation of application No. 17/332,110, filed on May 27, 2021.

(60) Provisional application No. 63/030,462, filed on May 27, 2020.

(51) Int. Cl.
  *G06Q 40/00* (2023.01)
  *G06Q 30/0234* (2023.01)
  *G06Q 40/04* (2012.01)

(52) U.S. Cl.
  CPC ......... *G06Q 40/04* (2013.01); *G06Q 30/0234* (2013.01)

(58) Field of Classification Search
  CPC .......................... G06Q 40/04; G06Q 30/0234
  See application file for complete search history.

(56) References Cited

U.S. PATENT DOCUMENTS

| | | |
|---|---|---|
| 6,618,707 B1 | 9/2003 | Gary |
| 7,853,499 B2 | 12/2010 | Czupek et al. |
| 10,055,791 B2 * | 8/2018 | Baker ................ H04L 69/14 |
| 2008/0097887 A1 | 4/2008 | Duquette et al. |
| 2014/0289091 A1 * | 9/2014 | Srivastava ............ G06Q 40/04 705/37 |
| 2017/0053349 A1 * | 2/2017 | Peck-Walden ......... G06Q 40/04 |
| 2017/0178235 A1 * | 6/2017 | Rooney ................. G06Q 40/04 |
| 2020/0167866 A1 * | 5/2020 | Schwall ................ G06Q 40/04 |
| 2020/0234368 A1 * | 7/2020 | Nafeh ................... G06Q 40/04 |
| 2021/0142412 A1 * | 5/2021 | Nafeh ................... G06Q 40/04 |
| 2021/0182969 A1 | 6/2021 | Creamer |
| 2021/0182971 A1 * | 6/2021 | Lutnick ................. G06Q 40/04 |

FOREIGN PATENT DOCUMENTS

WO      WO 200197099        12/2001

* cited by examiner

*Primary Examiner* — Rajesh Khattar
(74) *Attorney, Agent, or Firm* — Fish & Richardson P.C.

(57) ABSTRACT

A method is provided for implementing retail priority via an exchange computer system. In some implementations, first, second, and third orders for a financial instrument are received. A determination that the first order is at or inside the National Best Bid Offer (NBBO) associated with the financial instrument is made, and a determination that the third order is associated with a priority account is also made. A determination to prioritize execution of the first order over the second and third orders is made based on the first order being at or inside the NBBO, and a determination to prioritize execution of the third order over the second order is made based on the second order's association with the priority account.

19 Claims, 11 Drawing Sheets

NBBO: 10.00 X 10.10

ORDER 1: BUY 100 @ 10.00 – NON-RETAIL PRIORITY

ORDER 2: BUY 100 @ 10.00 – RETAIL PRIORITY

ORDER 3: SELL 100 @ 10.00 IOC

RESULT: ORDER3 TRADES WITH ORDER2 FOR 100 @ 10.00

FIG. 2A

NBBO: 10.00 X 10.10

ORDER 1: BUY 100 @ 10.00 – RETAIL PRIORITY

ORDER 2: BUY 100 @ 10.01 – NON-RETAIL PRIORITY

ORDER 3: SELL 100 @ 10.00 IOC

RESULT: ORDER3 TRADES WITH ORDER2 FOR 100 @ 10.01

FIG. 2B

NBBO: 10.00 X 10.10

ORDER 1: BUY 100 @ 10.01 – HIDDEN, NON-RETAIL PRIORITY

ORDER 2: BUY 100 @ 10.01 – HIDDEN, RETAIL PRIORITY

ORDER 3: SELL 100 @ 10.00 IOC

RESULT: ORDER3 TRADES WITH ORDER1 FOR 100 @ 10.01

FIG. 2C

NBBO: 10.00 X 10.10

ORDER 1: BUY 100 @ 10.00 +.03 DISCRETION – NON-RETAIL PRIORITY

ORDER 2: BUY 100 @ 10.00 +.03 DISCRETION - RETAIL PRIORITY

ORDER 3: SELL 100 @ 10.02 IOC

RESULT: ORDER3 TRADES WITH ORDER1 FOR 100 @ 10.02

FIG. 2D

NBBO: 10.00 X 10.01 (NOTHING ON EDGX OFFER)

ORDER 1: BUY 100 @ 10.01 - POST ONLY, DPS, NON-RETAIL PRIORITY
  - RANKED AT 10.01 HIDDEN AND DISPLAYED AT 10.00

ORDER 2: BUY 100 @ 10.01 – POST ONLY, DPS, RETAIL PRIORITY
  - RANKED AT 10.01 HIDDEN AND DISPLAYED AT 10.00

ORDER 3: SELL 100 @ 10.01 IOC

RESULT: ORDER3 TRADES WITH ORDER2 FOR 100 @ 10.01

FIG. 2E

NBBO: 10.00 X 10.10

ORDER 1: BUY 500 @ 10.00 - MAX FLOOR = 100, NON-RETAIL PRIORITY

ORDER 2: BUY 500 @ 10.00 -- MAX FLOOR = 100, RETAIL PRIORITY

ORDER 3: SELL 300 @ 10.00 IOC

RESULT: ORDER3 TRADES 100 @ 10.00 WITH ORDER 2 (DISPLAYED QTY)
ORDER3 TRADES 100 @ 10.00 WITH ORDER 1 (DISPLAYED QTY)
ORDER3 TRADES 100 @ 10.00 WITH ORDER 2 (HIDDEN QTY)

FIG. 2F

NBBO: 10.00 X 10.10

ORDER 1: BUY 100 @ 10.01 – SUPER AGGRESSIVE, NON-RETAIL PRIORITY

ORDER 2: BUY 100 @ 10.01 – SUPER AGGRESSIVE, RETAIL PRIORITY

NBBO CHG: 10.00 X 10.01 (100 SHARES AT NYSE ON OFFER)

RESULT: ORDER 2 IS LIFTED FROM THE BOOK AND ROUTED TO NYSE. ORDER 1 REMAINS POSTED.

FIG. 2G

NBBO: 10.00 X 10.10

ORDER 1: BUY 100 @ 10.01 – NON-RETAIL PRIORITY

ORDER 2: BUY 100 @ 10.01 – RETAIL PRIORITY, MTP=CANCEL NEWEST, MPID=AAAA

ORDER 3: SELL 100 @ 10.01 – MTP=CANCEL NEWEST, MPID=AAAA

RESULT: ORDER 3 IS CANCELED TO AVOID TRADING WITH ORDER 2.

FIG. 2H

ASSUME ORDERS BELOW ARE QUEUED FOR OPENING CROSS

ORDER 1: BUY 100 @ 10.01 – NON-RETAIL PRIORITY

ORDER 2: BUY 100 @ 10.01 – RETAIL PRIORITY

ORDER 3: SELL 100 @ 9.99

- OPENING IS TRIGGERED WITH 10.00 X 10.01 NBBO

RESULT: ORDER 2 AND ORDER3 TRADE 100 @ 10.005.

ORDER 1 IS RELEASED TO BOOK.

FIG. 21

EXCHANGE ORDER PRIORITIZATION

CROSS-REFERENCE TO RELATED APPLICATION

This application claims the benefit of U.S. Provisional Patent Application No. 63/030,462, filed May 27, 2020, and of U.S. patent application Ser. No. 17/332,110, filed May 27, 2021, each of which are incorporated herein by reference in their entirety.

TECHNICAL FIELD

This application relates to technology for trading financial instruments in electronic exchanges, including exchanges that combine electronic and open-outcry trading mechanisms.

BACKGROUND

Order execution refers to a process of accepting and completing an order for a financial instrument (e.g., buy order, sell order) that is received by an exchange. Order execution may be carried out manually or electronically, subject to limits or conditions placed on the order by an account holder. Order execution occurs when the order is filled, and not necessarily when the account holder places the order.

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO) (also known as first-come-first-served (FCFS)).

Within trading environments such as these, some professional market participants have sought advantage over non-professionals through the use of sophisticated computer algorithms that can analyze market conditions and react to changes by placing large volumes of orders at relatively high speeds—typically, within fractions of a second of a detected change. Such professional traders also often invest large sums in cutting-edge computer systems that can process and send orders at the highest possible speed. Not all traders have access to these resources, which command massive capital to obtain.

SUMMARY

The disclosure that follows relates to techniques for prioritizing the execution of orders for financial instruments via an exchange computer system. The disclosed technology enables market participants to opt in to an order priority system that ascribes priority to certain market participants regardless of the time of submission of orders, and reduces perceived technological disadvantages some market participants may experience due to an inability to acquire certain resources used for increasing the speed of sending orders to an exchange. The disclosed technology enables, for example, non-professional market participants to opt in to a system that can prioritize execution of their orders relative to orders associated with professional traders. In this and other ways, the disclosed technology enhances order execution speed, efficiency, fairness, and quality.

To prioritize execution of orders placed by non-professional market participants, the exchange computer system may use a priority-based allocation model that is different from a pure price-time priority that would match bids and offers based on the principle of first-in, first-out, to the exclusion of other considerations. The priority-based allocation model may, for example, reduce time to execution for non-professional market participants by facilitating transactions based on orders from the non-professional market participants in advance of transactions based on orders from professionals. For example, if a limit order for a financial instrument is associated with a priority account of a non-professional, then that order may be posted at the front of the order queue for the same-priced orders submitted on the exchange computer system by professionals, even if the non-professional's order is received later in time.

The exchange computer system may prioritize orders based on the classification of an account associated with the orders. For example, if an order at a certain price level for a financial instrument is associated with a priority account, the exchange computer system may provide priority to the order ahead of other available interest at the certain price level in an electronic order book. To ensure that enabling priority is appropriate, the exchange computer system may maintain a database with account information. The database may include criteria for classifying an account as a priority account, priority benefits to be provided to orders associated with priority accounts, requirements and/or actions for an account holder to claim priority account status, and/or protocols or rules for managing prioritization amongst different types of priority accounts.

In some implementations, the order execution prioritization techniques described throughout can be used to prioritize execution of orders for a financial instruments (e.g., stocks, options, mutual funds, exchange-traded funds, bonds, etc.) submitted by non-professional market participants over orders for the same financial instruments placed by professional market participants (sometimes referred to as institutional market participants).

According to some aspects, a method for retail priority is implemented via an exchange computer system. The method includes receiving a first order for a financial instrument, receiving a second order for the financial instrument, identifying an order type of the first order, and identifying an order type of the second order. The method also includes determining, based on information associated with the second order, that the second order is associated with a priority account. The method further includes determining, based on the order type of the first order, the order type of the second order, and the second order's association with the priority account, whether to prioritize execution of the second order over execution of the first order in an electronic order book.

One or more implementations can include the following optional features. In some implementations, the priority account has an average daily order number over a time period that does not exceed a threshold value. For example, the threshold value may be 390, and the time period may be one calendar month.

In some implementations, the first order is associated with a professional market participant, and the second order is associated with a non-professional market participant. The second order may, for example, be associated with a retail customer. In such implementations, the priority account is a non-broker dealer account that trades below a threshold volume in a given time period.

In some implementations, the method further includes determining, based on information associated with the first order, that the first order is associated with a non-priority account. In such implementations, determining whether to prioritize execution of the second order over execution of the first order in an electronic order book is further based on the first order's association with a non-priority account.

In some implementations, the method further includes displaying an order type of the first order on the electronic order book, displaying an order type of the second order on the electronic order book, and prioritizing execution of the second order over execution of the first order in the electronic order book.

In some implementations, for example when the identified order type of the first order is a buy order and when the identified order type of second order is also a buy order, the method further includes determining that an identified order value of the first order is equal to or greater than the identified order value of the second order, and determining not to prioritize execution of the second order over execution of the first order in the electronic order book.

In some implementations, the method further includes determining, based on information associated with the first order, that the first order is not displayed in the electronic order book, and determining, based on information associated with the second order, that the second order is not displayed in the electronic order book, and then determining not to prioritize execution of the second order over execution of the first order in the electronic order book.

In some implementations, the method further includes identifying, based on information associated with the first order, that the first order has a discretionary range, and identifying, based on information associated with the second order, that the second order has a discretionary range that is equal to the first order's discretionary range. In such implementations, the method may include determining not to prioritize execution of the second order over execution of the first order in the electronic order book.

In some implementations, the exchange computer system is a distributed computer system that includes an order entry port, an order routing system, an order matching system, and a prioritization engine. In such implementations, the order entry port may be configured to receive the first order, the order routing system may be configured to route the first order according to a destination associated with the first order, and the prioritization engine may be configured to determine that the second order is associated with a priority account. The order entry port may also be configured to receive the second order, the order routing system may also be configured to route the second order according to a destination associated with the second order, and the prioritization engine may be configured to determine that the first order is not associated with a priority account.

In some implementations, a port setting of an order entry port may be made available to the second order based on the information associated with the second order. In such implementations, the port setting of the order entry port may not be made available to the first order. The information associated with the second order may include a tag that indicates that the second order is eligible for retail priority, and the tag may further indicate that the second order is eligible for a retail rebate.

In some implementations, the method may include determining a price of the second order, determining a price of each of one or more additional matching orders, selecting a matching order based on price, facilitating a transaction based on the second order and the selected matching order, and, in response to facilitating a transaction based on the second order and the selected matching order, facilitating a transaction based on the first order.

According to another aspect, an exchange computer system may include one or more processors and one or more storage devices storing instructions that are operable, when executed by the one or more processors, to cause the one or more processors to perform operations. The operations may include receiving a first order for a financial instrument, receiving a second order for the financial instrument, identifying an order type of the first order, and identifying an order type of the second order. The operations may further include determining, based on information associated with the second order, that the second order is associated with a priority account and determining, based on the order type of the first order, the order type of the second order, and the second order's association with the priority account, whether to prioritize execution of the second order over execution of the first order in an electronic order book. In such implementations, the exchange computer system may be a distributed computer system that includes an order entry port, an order routing system, an order matching system, and a prioritization engine.

Certain implementations may provide various advantages. For example, the disclosed technology can be used to enhance the speed and efficiency with which an exchange computer system processes high volumes of orders. The disclosed technology can also be used to reduce risk exposures for the traders who opt in to the exchange's prioritization system, and to reduce disadvantages faced by some market participants in sending orders to an exchange.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIGS. 2A-I are diagrams of examples of various order prioritization scenarios.

DETAILED DESCRIPTION

Figure 1:
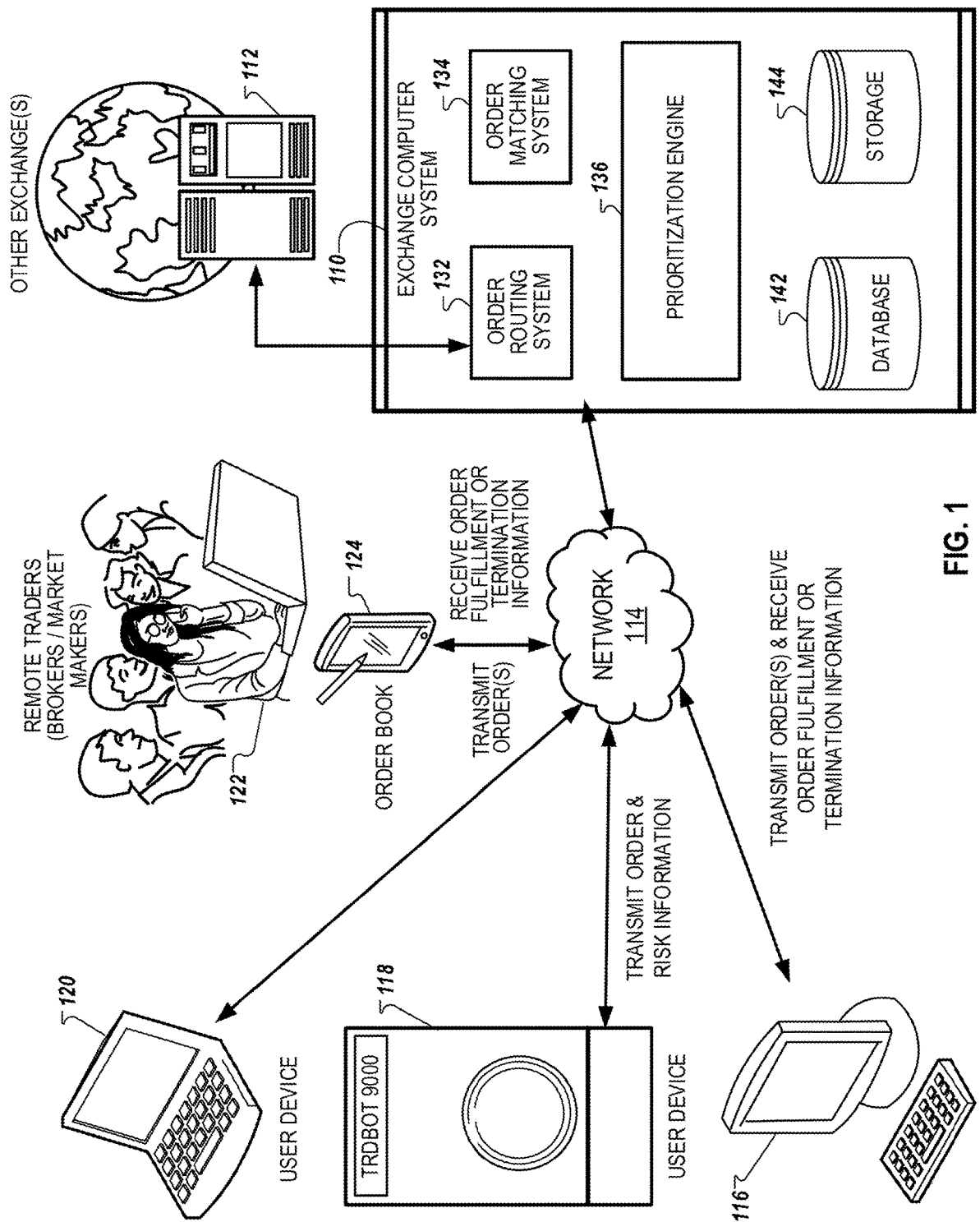
FIG. 1 is a diagram of an example of an exchange computer system that implements order prioritization, and the associated networks, devices, and users that make up an exemplary trading environment in which that system operates.

FIG. 1 is a diagram of an example of an exchange computer system that implements order prioritization, and the associated networks, devices, and users that make up an exemplary trading environment in which that system operates. Generally, the term "user" can refer to any entity that interacts with the exchange computer system and/or associated networks and devices. Users can include, for example, market makers and other market participants, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner. The exchange computer system 110 can receive orders from remote electronic devices. The financial instruments can include securities such as stocks, options, futures, or other derivatives associated with an underlying asset.

Network 114 can connect various components within the trading environment, and is configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or sub-networks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114. These devices can include, for example, a prioritization engine 136 of the exchange computer system 110, which can be configured to gather information received from multiple market participants and prioritize orders associated with the multiple market participants. Prioritization engine 136 can, for example, prioritize execution of orders received from an account associated with a non-professional market participant over execution of other orders received from an account associated with a professional trader (e.g., a trader associated with a brokerage firm).

A broker may execute an order based on a choice of markets. For example, for a stock that is listed on an exchange, a broker may direct the order to that exchange, to another exchange, or to a "market maker" who stands ready to buy or sell a stock listed on the exchange at publicly quoted prices. As another example, for a stock that trades in an over-the-counter (OTC) market, a broker may send the order to an "OTC market maker." In some instances, such as when a limit order is placed, a broker may route the order to an electronic communications network (ECN) that automatically matches buy and sell orders at specified prices. A broker may also "internalize" an order upon receipt, where the order is sent to another division of the broker's firm to be filled out of the firm's own inventory.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User devices 116, 118, and 120 can include portable or stationary electronic devices, such as smartphones, tablets, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

In some implementations, user devices 116, 118, and 120 can include displays for displaying representations of a trading platform. For example, the user devices 116, 118, and 120 can include or be coupled to graphical displays that include computer monitors. The user devices 116, 118, and 120 can include or be coupled to graphics engines and processors for processing high volumes of data to render information in real time.

User devices 116, 118, and 120 can transmit user input such as order information or risk information to the exchange computer system 110, and can also receive data from the exchange computer system 110 indicating that an order has been filled or canceled.

Users such as market makers/brokers 122 can also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a prioritization engine 136, a database 142 of trading rules and algorithms, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 can, for example, receive order or quote information for the purchase or sale of financial instruments from one or more user devices 116, 118, and 120.

Upon receiving an order or quote the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to a matching system (OMS) 134.

The OMS 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the OMS 134 can mark the matched order or quote with a broker-specific identifier so that the broker sending the order or quote information can be identified.

Orders matched by OMS 134 can for example, originate from within a trading environment by the exchange computer system 110, from other components of the exchange computer system 110, and/or from systems that are connected to the exchange computer system 110.

The prioritization engine 136 can be implemented via the exchange computer system 110, and/or in another system that is connected to the exchange computer system 110 via network 114. The prioritization engine 136 can include hardware and software for enabling the exchange computer system 110 to identify account information associated with orders for financial instruments and prioritize the execution of orders based on the classification of an account associated with the orders. For example, if an order at a certain price level for a financial instrument is associated with a priority account, the exchange computer system may provide priority to the order ahead of other available interest at the certain price level in an electronic order book. To ensure that enabling priority is appropriate, the prioritization engine 136 may maintain account information within database 142.

To prioritize execution of specific orders, the prioritization engine 136 may use a priority-based allocation model. The priority-based allocation model may focus on improving execution quality and trading outcomes (e.g., by reducing time to execution) for non-professional market participants and brokerage firms facilitating orders of these non-professional market participants. For example, if a limit order for a financial instrument is associated with a priority account, then the order may be posted at the front of an order queue for the same-priced orders submitted on the exchange computer system even if the order is received later in time.

In some implementations, the prioritization engine 136 is configured to prioritize execution of orders of a financial instrument submitted by non-professional market participants over orders of the financial instrument placed by institutional market participants. Examples of scenarios in which the prioritization engine 136 prioritizes execution of certain orders are depicted in FIGS. 2A-I.

Storage 144 and database 142 store and handle data in a manner that satisfies the privacy and security requirements of the exchange computer system 110 and its users, and can store one or more of telemetric data, user profiles, user history, and rules and algorithms for matching quotes, bids, and orders. In some implementations, storage 144 may include a database utilized by prioritization engine 136.

Database 142 can store data that specifies the rules by which the exchange computer system 110 can operate, as well as specific rules for the operation of prioritization engine 136. For example, database 142 can include rules that determine a how to prioritize the execution of specific orders received by the exchange computer system 110 for a number of traders participating in trading on a particular day. The type of prioritization can be adjusted for different trading scenarios and, in some cases, can be dependent on certain factors such as account information associated with the orders. The database 142 can also store rules for modifying prioritization and rules for executing orders by the exchange computer system 110. The database 142 can store information relating to criteria for classifying an account as a priority account, priority benefits to be provided to orders associated with priority accounts, requirements and/or actions for an account holder to claim priority account status, and/or protocols or rules for managing prioritization amongst different types of priority accounts.

The OMS 134 matches the buy side and sell side of a trade, and forwards the matched trade to a third party organization that verifies the proper clearance of the trade, such as the Options Clearing Corporation (OCC) where the securities can be options, or Depository Trust Company (DTC) where the securities can be equities. The OMS 134 can also format the quote and sale update information and send that information through an internal distribution system that refreshes displays, in addition to submitting the information to a quote and trade dissemination service such as, in the case of options, the Options Price Reporting Authority (OPRA). In the case of Equities, the information would be submitted to the Securities Information Processor (SIP). Upon completion of a trade, fill information for an order may also be passed through the OMS 134 and the ORS 132 to one or more user devices 116, 118, and 120.

FIGS. 2A-I are diagrams of examples of prioritization in different trading scenarios. Generally speaking, priority of execution is impacted by several factors. For instance, the priority of execution may be based on account information associated with an order, such as account classification (e.g., priority account, non-priority account), and/or a type of prioritization of a priority account (e.g., retail priority, non-retail priority). The priority of execution may also be based on order information, such as order type (e.g., displayed order, discretionary order, post only order), order conditions (e.g., time of entry), and/or other order attributes or specifications that may be indicated by, or applied to, an order.

FIG. 2A illustrates an example of a scenario in which a displayed retail priority order has priority of execution over a non-priority order. In this example, the National Best Bid Best Offer (NBBO) is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument (e.g., a stock or option) at the same price level ($10.00 per unit). The exchange computer system 110 then receives a third order (ORDER 3), which is an immediate-or-cancel (IOC) order to sell the financial instrument at the same price level as ORDER 1 and ORDER 2. In this example, the exchange computer system 110 prioritizes execution of ORDER 2 over execution of ORDER 1 since ORDER 2 is associated with a retail priority account, while ORDER 1 is associated with a non-retail priority account. As a result, the exchange computer system 110 prioritizes ORDER 2 in the electronic order book such that ORDER 3 trades with ORDER 2, despite ORDER 1 having been received first in time.

FIG. 2B illustrates an example of a scenario in which a better-priced non-priority order has priority of execution over a worse-priced priority order. In this example, the NBBO is $10.00×$10.10. The exchange computer system 110 receives a first order (ORDER 1) from a retail priority account and a second order (ORDER 2) from a non-retail priority account. ORDER 1 and ORDER 2 are both buy orders for the same financial instrument but at different price levels ($10.00 per unit for ORDER 1, $10.01 per unit for ORDER 2). The exchange computer system 110 then receives a third order (ORDER 3), which is an IOC order to sell the financial instrument at the same price level as ORDER 1. In this example, the exchange computer system 110 does not prioritize execution of ORDER 1 over execution of ORDER 2 even though ORDER 1 is associated with a retail priority account while ORDER 2 is not. This is because ORDER 2 has a better price level, which favors execution and thereby results in ORDER 3 trading with ORDER 2.

FIG. 2C illustrates an example of a scenario in which a hidden non-retail priority order does not have priority of execution over a hidden retail priority order. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.01 per unit). In this example, ORDER 1 and ORDER 2 are also provided with instructions to hide the orders from being displayed on an electronic order book. The exchange computer system 110 then receives a third order (ORDER 3), which is an IOC order to sell the financial instrument at a lower price level than ORDER 1 and ORDER 2. In this example, the exchange computer system 110 does not prioritize execution of ORDER 2 over execution of ORDER 1 even though ORDER 2 is associated with a retail priority account while ORDER 1 is not. This is because both orders are hidden orders for which the exchange computer system 110 does not perform prioritization.

FIG. 2D illustrates an example of a scenario in which a retail priority order does not have priority of execution in a discretionary range. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.00 per unit). In this example, ORDER 1 and ORDER 2 are also provided with a discretionary range of $0.03 over which the orders are eligible to execute. The exchange computer system 110 then receives a third order (ORDER 3), which is an IOC order to sell the financial instrument at a price level that is within the discretionary ranges of both ORDER 1 and ORDER 2. In this example, the exchange computer system 110 does not prioritize execution of ORDER 2 over execution of ORDER 1 even though ORDER 2 is associated with a retail priority account while ORDER 1 is not. This is because the price level of ORDER 3 is within the discretionary ranges specified by ORDER 1 and ORDER 2, so the exchange computer system 110 does not perform prioritization.

FIG. 2E illustrates an example of a scenario in which display price sliding retail priority orders have priority of execution at a hidden locking price. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.01 per unit). In this example, ORDER 1 and ORDER 2 are also both post-only orders that are ranked with a hidden locking price of $10.01 (but displayed at $10.00). The exchange computer system 110 then receives a third order (ORDER 3), which is an IOC order to sell the financial instrument at a price level that matches the ranked price of both ORDER 1 and ORDER 2. In this example, the exchange computer system 110 prioritizes execution of ORDER 2 over execution of ORDER 1 since ORDER 2 is classified as a display price sliding retail priority order that has priority of execution over non-retail orders at the hidden locking price (i.e., $10.01).

FIG. 2F illustrates an example of a scenario in which a retail priority reserve order has displayed and hidden priority of execution. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.00 per unit). In this example, ORDER 1 and ORDER 2 are both reserve orders with a max floor of 100 and with hidden and displayed portions. The exchange computer system 110 then receives a third order (ORDER 3), which is an IOC order to sell the financial instrument at a price level that matches the price of both ORDER 1 and ORDER 2. In this example, the exchange computer system 110 prioritizes execution of ORDER 2 over execution of ORDER 1 by allowing the displayed portion of ORDER 2 (100 shares) to trade with 100 shares of ORDER 3. Then, the exchange computer system 110 matches a displayed portion of ORDER 1 (100 shares) to trade with 100 shares of ORDER 3. The remaining 100 shares of ORDER 3 are then traded with a hidden portion of the remaining 100 shares of ORDER 2.

FIG. 2G illustrates an example of a scenario in which a resting super aggressive retail priority order routes before a non-retail priority order. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.01 per unit). In this example, ORDER 1 and ORDER 2 also include a resting super aggressive instruction, which impacts display of orders on the electronic order book. The NBBO for the financial instrument is then changed such that 100 units of the financial instrument are now available on offer at NYSE. In response, the exchange computer system 110 lifts ORDER 2 from the electronic order book and routes it to NYSE, while ORDER 1 remains posted on the electronic order book. In this example, ORDER 2 is prioritized for routing to NYSE even though the exchange computer system 110 receives it after receiving ORDER 1, since ORDER 2 is associated with a retail priority account whereas ORDER 1 is not associated with such an account.

FIG. 2H illustrates an example of a scenario in which match trade prevention (MTP) is applied immediately to a retail priority order. In this example, the NBBO is $10.00×$10.10. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.01 per unit). In this example, ORDER 2 is provided with a MTP instruction to cancel the order if the order will be executed against another order with the unique identifier "NOPE." The exchange computer system 110 then receives a third order (ORDER 3), which is an IOC order to sell the financial instrument at a price level that matches the price of both ORDER 1 and ORDER 2 and has an MTP instruction similar to ORDER 2. In this example, the exchange computer system 110 prioritizes execution of ORDER 2 over execution of ORDER 1 since ORDER 2 is associated with a retail priority account and ORDER 1 is not. However, due to the MTP instructions of both ORDER 2 and ORDER 3, the exchange computer system 110 cancels ORDER 3 to avoid trading with ORDER 2.

FIG. 2I illustrates an example of a scenario in which retail priority orders have priority of execution in an opening process. In this example, orders are queued for execution on market opening process. The exchange computer system 110 receives a first order (ORDER 1) from a non-retail priority account and a second order (ORDER 2) from a retail priority account. ORDER 1 and ORDER 2 are both buy orders for the same financial instrument at the same price level ($10.01 per unit). The exchange computer system 110 then receives a third order (ORDER 3), which is an order to sell the financial instrument at a price level below both ORDER 1 and ORDER 2 ($9.99 per unit). The opening is then triggered with $10.00×10.01 NBBO and the exchange computer system 110 prioritizes execution of ORDER 2 over execution of ORDER 1 since ORDER 2 is associated with a retail priority account and ORDER 1 is not. As a result, on the open, ORDER 2 trades with ORDER 3 for 100 shares at the midpoint price of $10.005 and ORDER 1 is released to the electronic order book.

Figure 3:
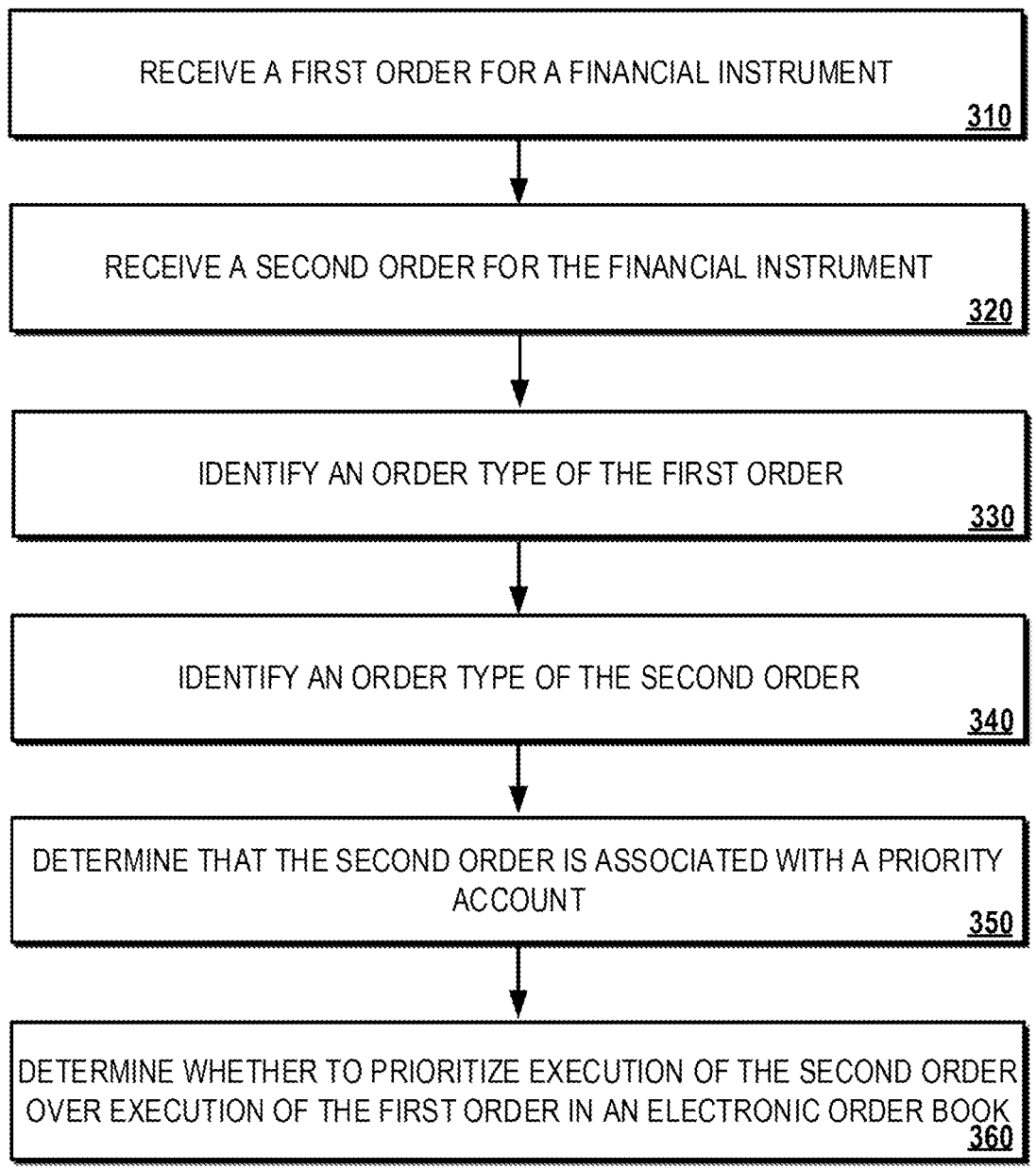
FIG. 3 is a flowchart of an example process for order prioritization.

FIG. 3 is a flowchart of an example of a process 300 for providing exchange order prioritization. Briefly, the process 300 includes receiving a first order for a financial instrument (310), receiving a second order for the financial instrument (320), identifying an order type of the first order (330), identifying an order type of the second order (340), determining that the second order is associated with a priority account (350), and determining whether to prioritize execution of the second order over execution of the first order in an electronic order book (360).

In more detail, the process 300 includes receiving a first order for a financial instrument (310), and a second order for the financial instrument (320). For example, in the scenario shown in FIG. 2A, the exchange computer system 110 receives two orders (e.g., ORDER 1, ORDER 2) to buy the same financial instrument (e.g., a stock) at the same price level (e.g., $10.00 per share). For purposes of this example, although ORDER 2 is received after ORDER 1 (i.e., ORDER 2 is received later in time by the exchange computer 110 compared to receipt of ORDER 1), ORDER 2 will be described as the first order within the process 300, and ORDER 1 will be described as the second order within the process 300.

The process 300 includes identifying an order type of the first order (330). For example, in the scenario shown in FIG. 2A, the exchange computer system 110 determines that ORDER 2 is a limit order with a specified price of $10.00 per share to buy 100 shares of a stock.

The process 300 includes identifying an order type of the second order (340). For example, in the scenario shown in FIG. 2A, the exchange computer system 110 determines that ORDER 1 is a limit order with a specified price of $10.00 per share to buy 100 shares of a stock.

The process 300 includes determining that the second order is associated with a priority account (350). For example, in the scenario shown in FIG. 2A, the exchange computer system 110 determines that ORDER 2 is associated with a retail priority account (e.g., an account associated with a non-professional market participant). Additionally, the exchange computer system 110 determines that ORDER 1 is associated with a non-retail priority account (e.g., an account associated with a professional market participant, such as an institutional investor).

The process 300 includes determining whether to prioritize execution of the second order over execution of the first order in an electronic order book (360). For example, in the scenario shown in FIG. 2A, the exchange computer system 110 determines to prioritize execution of ORDER 2 over execution of ORDER 1 since ORDER 2 is associated with a retail priority account while ORDER 1 is associated with a non-retail priority account. In this example, the exchange computer system provides priority of execution by routing orders of account holders that classify as non-professional market participants before orders of other account holders that do not (e.g., account holders that are institutional investors). In this way, even though the exchange computer system receives ORDER 2 later in time than ORDER 1, the exchange computer system 110 routes ORDER 2 to the electronic order book before ORDER 1, which then results in ORDER 2 trading with ORDER 3 (order to sell 100 shares at a price of $10.00 per share).

The above example focuses on the scenario shown in FIG. 2A, but the process 300 encompasses other scenarios relating to order prioritization, such as the exemplary scenarios shown in FIGS. 2B-K. For example, in some implementations, and as part of the process of determining whether to prioritize orders, the exchange computer system 110 can also determine if an order has a discretionary range (shown in FIG. 2D), whether an order includes a hidden locking price (shown in FIG. 2E), among other determinations.

In some implementations, a priority account is one that has an average daily order number over a time period that does not satisfy a threshold value. For example, the exchange computer system 110 may determine that an account is a priority account if it had less than 390 orders during each month of the previous calendar year. In such implementations, account holders may be required to submit account activity on a quarterly basis so that the exchange computer system 110 may periodically adjust account classification for the purpose of order prioritization.

In some implementations, the process 300 includes additional operations. For example, the process 300 can include determine that the first order is associated with a non-priority account based on information associated with the first order. In such implementations, determining whether to prioritize execution of the second order over execution of the first order in an electronic order book is further based on the first order's association with a non-priority account. For example, the exchange computer system 110 determines to prioritize execution of the second order over execution over the first order based on the first order being associated with the non-priority account.

In some implementations, the process 300 includes displaying an order type of the first order on the electronic order book and displaying order type of the second order on the electronic order book. For example, if the orders are limit orders with a corresponding displayed price, the exchange computer system 110 may display the displayed prices of the first order and the second order on the electronic order book. The process 300 also includes prioritizing execution of the second order over execution of the first order in the electronic order book.

In some implementations, the process 300 includes identifying an order value of the first order. For example, the exchange computer system 110 can identify the order type of the first order as a buy order. The process 300 can also include identifying an order value of the second order. For example, the exchange computer system 110 can identify the order type of the second order as a buy order for a specific order value. The process 300 may also include determining that the identified order value of the second order is equal to or greater than the identified order value of the first order and determining not to prioritize execution of the second order over execution of the first order in the electronic order book. In this example, if the second order has an order value that exceeds the order value of the first order, then the exchange computer system does not perform prioritization since the first order and second order are not at the same price level on the electronic order book.

In some implementations, the process 300 includes determining that the first order is displayed in the electronic order book based on information associated with the first order. For example, the exchange computer system 110 can determine that the first order is a fully displayed order. The process 300 also includes determining that the second order is not displayed in the electronic order book based on information associated with the second order. For example, the exchange computer system 110 can determine that the second order is provided with an instruction to hide a reserved portion of the order. The process 300 includes determining not to prioritize execution of the second order over execution of the first order in the electronic order book. In this example, the exchange computer system 110 determines not to prioritize execution of the second order over execution of the first order since hidden orders do not receive priority of execution over displayed orders.

In some implementations, the process 300 includes identifying that the first order has a discretionary range based on information associated with the first order. The process 300 also includes identifying that the second order has a discretionary range based on information associated with the second order. For example, the second order's discretionary range may be equal to the first order's discretionary range. As with the scenario shown in FIG. 2D, in this example, the exchange computer system 110 determines not to prioritize execution of the second order over execution of the first order in the electronic order book since priority orders do not receive priority of execution over non-priority orders in the same discretionary range.

In some implementations, the computer system 110 can be configured to prioritize execution of orders for a financial instrument based on whether orders are associated with priority accounts as well as whether orders are submitted at or within the NBBO. In such implementations, the computer system 110 may implement priority such that an order received first in time at the NBBO is given top priority, and a subsequent order that is associated with a priority account is given next priority above orders that are not associated with a priority account.

For example, the computer system 110 may receive a first order for a financial instrument at or within the NBBO, a second order for the financial instrument from a non-priority account (e.g., an account of a professional market participant), and a third order for the financial instrument from a priority account (e.g., a retail customer account). In this example, the computer system 110 may prioritize execution of orders such that the first order is initially executed (i.e., top priority), the third order is next executed, and the second order is executed last. By this exemplary prioritization scheme, computer system 110 may allow orders at or within the NBBO but associated with non-priority accounts to be provided priority over other orders associated with priority accounts but outside the NBBO.

For example, the computer system 110 can prioritize execution of a first order that is at or within the NBBO and provided by a market maker, over execution of a second order that is outside of the NBBO but provided by a retail customer. In this example, the computer system 110 can also prioritize execution of the retail customer's second order over other orders that are received after the first order, but that are provided by professional market participants. In this way, after initial prioritization of an order at or within the NBBO, the computer system 110 implements retail priority in a similar manner as described throughout this disclosure.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A method of prioritizing orders in an order queue in an exchange computer system comprising one or more processors configured to perform operations of an order routing system, an order matching system, and a prioritization engine, the method comprising:

receiving, by the exchange computer system, a stream of incoming data that encodes, using a communication protocol implemented over transmission control protocol/Internet Protocol (TCP/IP), transaction requests submitted from one or more remote computing devices, wherein the stream of incoming data is decoded using the communication protocol to provide a first transaction request for trading a financial instrument at or inside a National Best Bid Offer (NBBO) in the financial instrument, a second transaction request for trading the financial instrument outside the NBBO in the financial instrument, and a third transaction request for trading the financial instrument outside the NBBO in the financial instrument;

associating, by the exchange computer system using the one or more processors, the first transaction request, and second transaction request, and the third transaction request respectively with a first account, a second account, and a third account such that the second transaction request is queued in the order queue in the exchange computer system after the first transaction request by the order matching system, and the third transaction request is queued in the order queue after the second transaction request;

responsive to the order matching system identifying, using one or more of the one or more processors, a matching transaction request for the financial instrument, executing, the first transaction request at or inside the NBBO by the exchange computer system ahead of the second and the third transaction requests queued in the order queue;

determining, by the exchange computer system using the one or more processors, based on decoded information from the stream of incoming data and rules stored in a database on the exchange computer system, whether the second account or the third account is a priority account;

automatically posting, by the prioritization engine using one or more of the one or more processors, the third transaction request to a first position of the order queue, based on determining, by the exchange computer system, that (i) the third account is the priority account and the second account is not the priority account, and (ii) the third account has performed a volume of trades that is less than a threshold volume in a given time period, such that the third transaction request is posted at a front of the order queue;

identifying, by the order matching system using one or more of the one or more processors and based on the third transaction request, another matching transaction request for the financial instrument;

routing, to the order matching system and by the order routing system, the third transaction request using one or more of the one or more processors in response to the identifying of the matching transaction request and based on the order queue;

executing, by the exchange computer system using one or more of the one or more processors, the routed third transaction request ahead of the second transaction request; and transmitting, by the exchange computer system using the one or more processors and to at least one of the one or more remote computing devices, fill information for the first and third transaction requests encoded using the communication protocol.

2. The method of claim 1, further comprising:
determining, based on decoded information from the stream of incoming data and the rules stored on the database on the exchange computer system, that the first transaction request is not submitted from the priority account.

3. The method of claim 1:
wherein the first transaction request is associated with a first professional market participant;
wherein the second transaction request is associated with a second professional market participant; and
wherein the third transaction request is associated with a non-professional market participant.

4. The method of claim 1,
wherein the third transaction request is received after the second transaction request is received.

5. The method of claim 1,
wherein the second transaction request is received after the first transaction request is received.

6. An exchange computer system comprising:
an order entry port configured to receive a stream of incoming data that encodes, using a communication protocol implemented over transmission control protocol/Internet Protocol (TCP/IP), electronic transaction requests submitted from one or more remote computing devices;
an order routing system;
an order matching system; and
a prioritization engine configured to operate in tandem with the order routing system and the order matching system,
wherein the exchange computer system comprises one or more processors and one or more storage devices storing a database and instructions that are operable, when executed by the one or more processors, to cause the exchange computer system to perform operations comprising:
receiving, via the order entry port by the exchange computer system, the stream of incoming data using the communication protocol to provide a first transaction request for trading a financial instrument at or inside a National Best Bid Offer (NBBO) in the financial instrument, a second transaction request for trading the financial instrument outside the NBBO in the financial instrument, and a third transaction request for trading the financial instrument outside the NBBO in the financial instrument;
associating, by the exchange computer system using the one or more processors, the first transaction request, and second transaction request, and the third transaction request respectively with a first account, a second account, and a third account such that the second transaction request is queued in an order queue on the exchange computer system after the first transaction request by the order matching system, and the third transaction request is queued in the order queue after the second transaction request;
responsive to the order matching system identifying, using the one or more processors, a matching transaction request for the financial instrument, executing, the first transaction request at or inside the NBBO by the exchange computer system ahead of the second and the third transaction requests queued in the order queue;
determining, by the exchange computer system using the one or more processors, based on decoded information from the stream of incoming data and rules stored in the database on the exchange computer system, whether the second account or the third account is a priority account;
automatically posting, by the prioritization engine using one or more of one or more of the one or more processors, the third transaction request to a first position of the order queue, based on determining, by the exchange computer system, that (i) the third account is the priority account and the second account is not the priority account, and (ii) the third account has a volume of trades that is less than a threshold trade volume in a given time period, such that the third transaction request is posted at a front of the order queue;
identifying, by the order matching system using one or more of the one or more processors and based on the third transaction request, another matching transaction request for the financial instrument;

routing, to the order matching system and by the order routing system, the third transaction request using one or more of the one or more processors in response to the identifying of the matching transaction request and based on the order queue, the third transaction request to the order matching system ahead of the second transaction request;

executing, by the exchange computer system using the one or more processors, the routed third transaction request ahead of the second transaction request; and transmitting, by the exchange computer system using the one or more processors and to at least one of the one or more remote computing devices, fill information for the first and third transaction requests encoded using the communication protocol.

7. The method of claim 1, further comprising:

determining, based on decoded information from the stream of incoming data, whether the second transaction request or the third transaction request has a transactional amount that is not known to the one or more remote computing devices by the exchange computer system.

8. The method of claim 7, wherein said automatic posting of the third transaction request to the first position of the order queue is further responsive to determining that the transactional amount of the third transaction request is identifiable by the one or more remote computing devices by the exchange computer system.

9. The method of claim 7, further comprising:

determining that a full transaction amount of the third transaction request and a full transactional amount of the second transaction request are identifiable by the one or more remote computing devices by the exchange computer system; and prioritizing the third transaction request over the second transaction request such that the full transactional amount of the third transaction request is executed by the order matching system ahead of the second transaction request.

10. The method of claim 1, further comprising:

in response to determining that the second transaction request provides a higher price than that the third transaction request, executing the second transaction request and the third transaction request as queued in the order queue by the order matching system.

11. The method of claim 1, further comprising:

configuring the database on the exchange computer system configured to record a number of electronic transaction requests submitted by each user account such that the priority account is limited to a threshold number of submissions on a given day.

12. The method of claim 11, wherein the threshold number is 390 submissions measured as an average daily order number over one calendar month by the given day.

13. The method of claim 1, wherein the third transaction request is submitted by a retail customer, and wherein the priority account is a non-broker dealer account that trades below a threshold trade volume in the given time period.

14. The exchange computer system of claim 6, further comprising:

a database coupled to the prioritization engine and configured to record a number of electronic transaction requests submitted by each user account such that the priority account is limited to a threshold number of submissions on a given day.

15. The exchange computer system of claim 14, wherein the threshold number is 390 submissions measured as an average daily order number over one calendar month by the given day.

16. The method of claim 1, wherein the communication protocol comprises a financial information exchange (FIX) protocol.

17. The exchange computer system of claim 6, wherein the communication protocol comprises a financial information exchange (FIX) protocol.

18. The method of claim 1, wherein the stream of incoming data is decoded in real time using the communication protocol.

19. The exchange computer system of claim 6, wherein receiving the stream of incoming data using the communication protocol further comprises decoding the stream of incoming data in real time using the communication protocol.

* * * * *

UNITED STATES PATENT AND TRADEMARK OFFICE
CERTIFICATE OF CORRECTION

Page 1 of 1

PATENT NO. : 12,307,516 B1
APPLICATION NO. : 17/470878
DATED : May 20, 2025
INVENTOR(S) : William Ciabattoni and Adam Inzirillo It is certified that error appears in the above-identified patent and that said Letters Patent is hereby corrected as shown below:

On the Title Page

Abstract, Item (57), Line 5, after "Bid" insert -- and --

In the Claims

Column 14, Line 62, Claim 1, after "Bid" insert -- and -- and

Column 16, Line 26, Claim 6, after "Bid" insert -- and -- and

Column 16, Line 56, Claim 6, delete "one or more of one or more of" and insert -- one or more of --

Signed and Sealed this
Twenty-sixth Day of August, 2025

Coke Morgan Stewart
*Acting Director of the United States Patent and Trademark Office*